United States Patent
Wu et al.

(10) Patent No.: US 10,917,196 B2
(45) Date of Patent: Feb. 9, 2021

(54) EFFICIENT TRANSMISSION OF SMALL PACKETS IN LOW POWER AND LOSSY NETWORKS

(71) Applicant: Cisco Technology, Inc., San Jose, CA (US)

(72) Inventors: Wenjia Wu, Shanghai (CN); Nan Yi, Shanghai (CN); Huimin She, Shanghai (CN); Chuanwei Li, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/273,251

(22) Filed: Feb. 12, 2019

(65) Prior Publication Data
US 2020/0259592 A1 Aug. 13, 2020

(51) Int. Cl.
| | |
|---|---|
| *H04L 1/00* | (2006.01) |
| *H04L 29/06* | (2006.01) |
| *H04L 5/00* | (2006.01) |
| *H04L 1/16* | (2006.01) |
| *H04W 28/06* | (2009.01) |
| *H04W 80/02* | (2009.01) |
| *H04L 29/08* | (2006.01) |

(Continued)

(52) U.S. Cl.
CPC .......... *H04L 1/0083* (2013.01); *H04L 1/0061* (2013.01); *H04L 69/22* (2013.01); *H04L 1/1614* (2013.01); *H04L 5/0044* (2013.01); *H04L 5/0055* (2013.01); *H04L 5/0094* (2013.01); *H04L 45/502* (2013.01); *H04L 69/323* (2013.01); *H04W 28/06* (2013.01); *H04W 72/0446* (2013.01); *H04W 80/02* (2013.01)

(58) Field of Classification Search
CPC . H04W 28/06; H04W 72/0446; H04W 80/02; H04L 5/0055; H04L 1/1614; H04L 5/0094; H04L 69/323; H04L 5/0044; H04L 45/502; H04L 1/0083; H04L 1/0061; H04L 69/22
See application file for complete search history.

(56) References Cited

U.S. PATENT DOCUMENTS

| | | |
|---|---|---|
| 7,869,429 B2 | 1/2011 | Toyomura et al. |
| 8,073,327 B2 | 12/2011 | Mayer |
| 8,897,298 B2 | 11/2014 | Wentink |

(Continued)

OTHER PUBLICATIONS

Apcar, et al., "IP in Smart Object Networks", IP in Smart Object Networks V1.7, 59 pages, 2011, Cisco.

(Continued)

*Primary Examiner* — April Y Blair
*Assistant Examiner* — Sazzad Hossain
(74) *Attorney, Agent, or Firm* — Behmke Innovation Group LLP; Kenneth J. Heywood; Jonathon P. Western

(57) ABSTRACT

In one embodiment, a device in a network determines that a plurality of packets should be aggregated, each of the plurality of packets comprising a payload. The device generates, for each of the payloads, a sub-media access control (sub-MAC) header that comprises a sequence number and a frame check sequence (FCS). The device forms an aggregated packet that comprises a physical layer (PHY) header, a MAC header, the payloads, and the generated sub-MAC headers for the payloads. The device sends the aggregated packet to another device in the network.

20 Claims, 9 Drawing Sheets

(51) Int. Cl.
*H04W 72/04* (2009.01)
*H04L 12/723* (2013.01)

(56) References Cited

U.S. PATENT DOCUMENTS

| | | | |
|---|---|---|---|
| 9,515,925 B2 | 12/2016 | Wentink et al. | |
| 2004/0258092 A1* | 12/2004 | Sugaya | H04W 40/00 370/474 |
| 2008/0313518 A1* | 12/2008 | Naoe | H04L 1/16 714/748 |
| 2009/0109944 A1* | 4/2009 | Kwon | H04W 99/00 370/338 |
| 2009/0238208 A1* | 9/2009 | Naka | H04L 47/10 370/470 |
| 2011/0125749 A1 | 5/2011 | Wood et al. | |
| 2017/0280359 A1* | 9/2017 | Dong | H04W 28/18 |
| 2018/0124638 A1* | 5/2018 | Del Carpio Vega | H04W 28/06 |
| 2019/0007941 A1* | 1/2019 | Cavalcanti | H04B 7/2656 |

OTHER PUBLICATIONS

Dely, et al., "An Experimental Comparison of Burst Packet Transmission Schemes in IEEE 802.11-based Wireless Mesh Networks", GLOBECOM 2010 IEEE Global Telecommunications Conference, 5 pages, 2010, IEEE.

Oliveira, et al., "Routing and mobility approaches in IPv6 over LoWPAN mesh networks", International Journal of Communication Systems, pp. 1445-1466, 2011, John Wiley & Sons, Ltd.

Palattella, et al., "Standardized Protocol Stack for the Internet of (Important) Things", IEEE Communications Surveys & Tutorials, Accepted for Publication, pp. 1-18, 2012, IEEE.

Thubert, et al., "An Architecture for IPv6 over the TSCH mode of IEEE 802.15.4 draft-ietf-6tisch-architecture-19", Internet Engineering Task Force, Dec. 17, 2018, pp. 1-60.

Montenegro, et al., "Transmission of IPv6 Packets over IEEE 802.15.4 Networks", Network Working Group, The IETF Trust, 2007, pp. 1-30.

Hui, et al., "Compression Format for IPv6 Datagrams over IEEE 802.15.4-Based Networks", Internet Engineering Task Force, 2011, pp. 1-24.

Winter, et al., "RPL: IPv6 Routing Protocol for Low Power and Lossy Networks", Internet Engineering Task Force, 2012, pp. 1-157.

Vasseur, et al., "Routing Metrics Used for Path Calculation in Low-Power and Lossy Networks", Internet Engineering Task Force, 2012, pp. 1-30.

Thubert, et al., "Objective Function Zero for the Routing Protocol for Low-Power and Lossy Networks", Internet Engineering Task Force, 2012, pp. 1-14.

Gnawali, et al., "The Minimum Rank with Hysteresis Objective Function", Internet Engineering Task Force, 2012, pp. 1-13.

"6LoWPAN", online: https://en.wikipedia.org/wiki/6LoWPAN, dated Nov. 17, 2018, printed Jan. 24, 2019, 5 pages, Wikimedia Foundation, Inc.

\* cited by examiner

EFFICIENT TRANSMISSION OF SMALL PACKETS IN LOW POWER AND LOSSY NETWORKS

TECHNICAL FIELD

The present disclosure relates generally to computer networks, and, more particularly, to the efficient transmission of small packets in Low power and Lossy Networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

In Smart Grid and other forms of LLN deployments, one key consideration is transmission time. Indeed, transmission time is important not only for improving throughput, but also for reducing collisions between different nodes. Furthermore, reducing transmission times can also help to reduce transmit power consumptions, which can be very important in the case of LLN nodes that are battery powered. However, current approaches to reducing transmission times still introduce a non-negligible amount of overhead due to frame headers, which is especially true in the case of small packets, as well as due to the use of redundant back-off times.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network determines that a plurality of packets should be aggregated, each of the plurality of packets comprising a payload. The device generates, for each of the payloads, a sub-media access control (sub-MAC) header that comprises a sequence number and a frame check sequence (FCS). The device forms an aggregated packet that comprises a physical layer (PHY) header, a MAC header, the payloads, and the generated sub-MAC headers for the payloads. The device sends the aggregated packet to another device in the network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
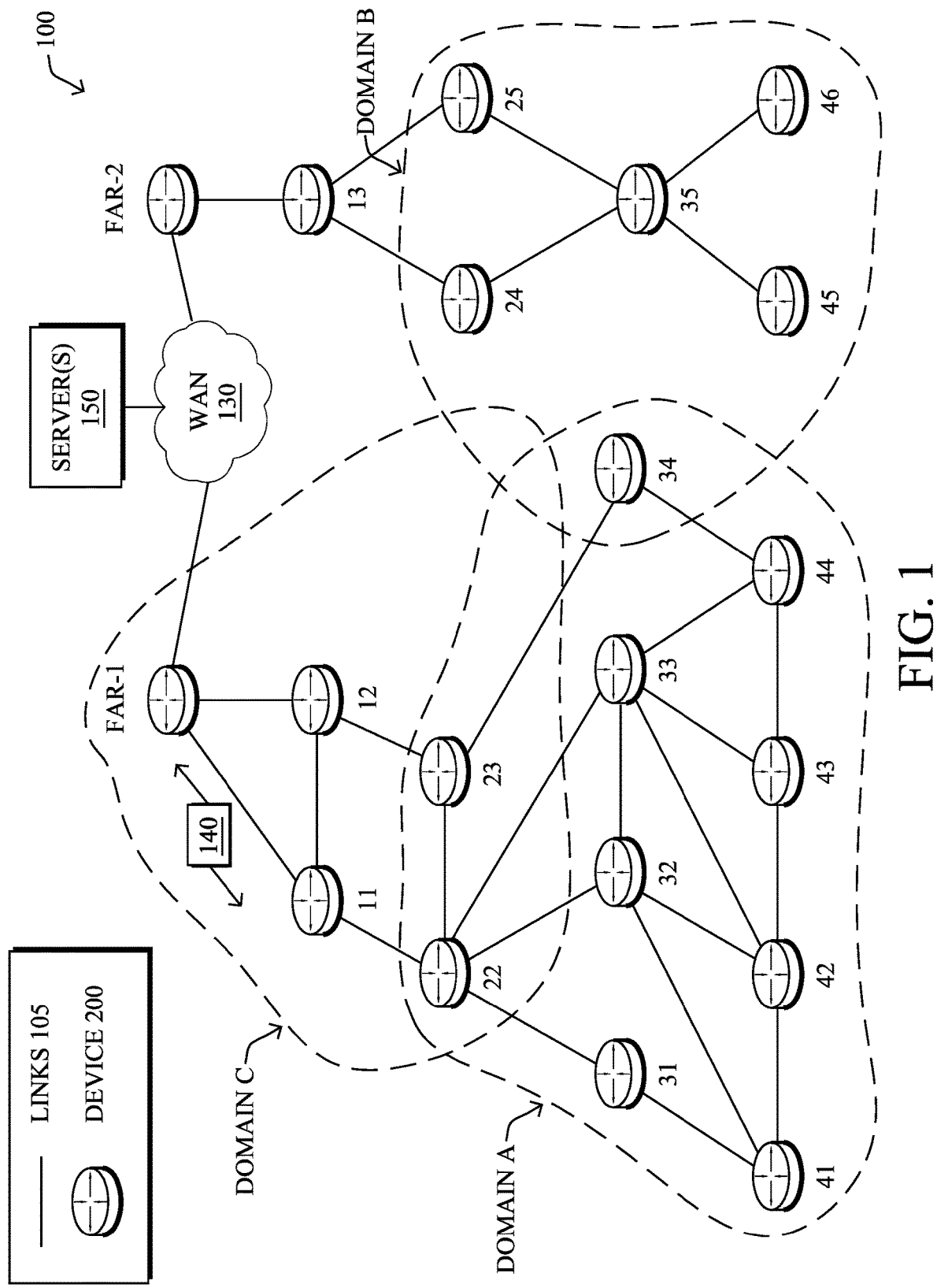
FIG. 1 illustrates an example communication network.

FIG. 1 is a schematic block diagram of an example communication network 100 illustratively comprising nodes/devices 200 (e.g., labeled as shown, "FAR-1," "FAR-2," and "11," "12," . . . "46," and described in FIG. 2 below)

interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the communication network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

In some embodiments, network 100 may be configured as a deterministic network. Generally, deterministic networking refers to networks that can guaranty the delivery of packets within a bounded time. For example, industrial networking typically requires predictable communications between devices (e.g., to actuate a machine along an assembly line at a precise time, etc.). This translates into the following criteria: 1.) a high delivery ratio (e.g., a loss rate of 10-5 to 10-9, depending on the application), 2.) fixed latency, and 3.) jitter close to zero (e.g., on the order of microseconds).

A limited degree of control over the timing of network traffic can be achieved by using quality of service (QoS) tagging and/or performing traffic shaping/admission control. For time sensitive flows, though, latency and jitter can only be fully controlled by scheduling every transmission at every hop. In turn, the delivery ratio can be optimized by applying packet redundancy with all possible forms of diversity in terms of space, time, frequency, code (e.g., in CDMA), hardware (e.g., links, routers, etc.), software (implementations), etc. Most of the methods above apply to both Ethernet and wireless technologies. Mixed approaches may combine QoS technologies with scheduling (e.g., triggering emission of packets on the different QoS queues using a schedule-based gate mechanism).

Figure 2:
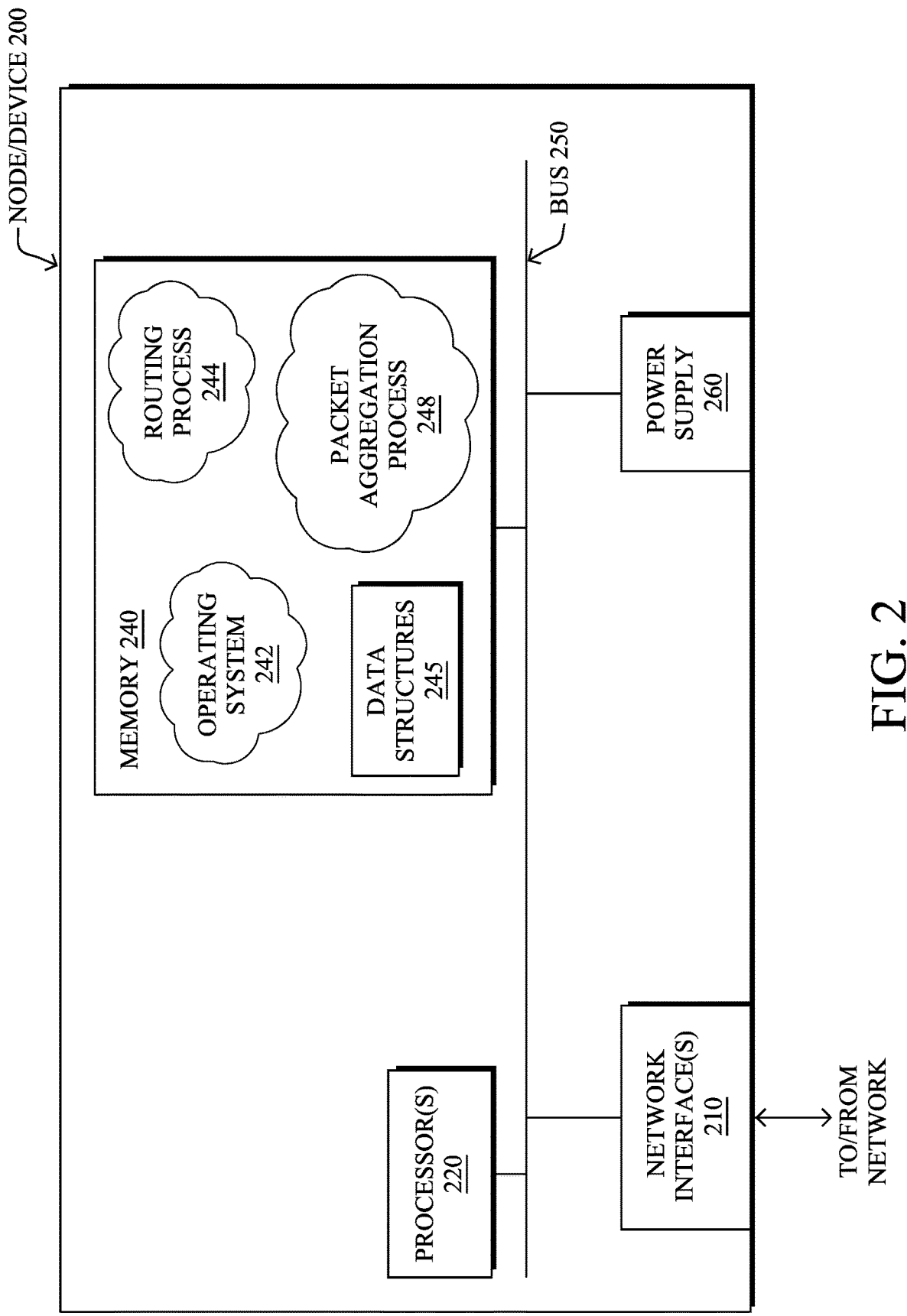
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative packet aggregation process 248 as described in greater detail below. Note that while processes 244, 248 are shown in centralized memory 240, alternative embodiments provide for either or both of processes 244, 248 to be operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low-power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Deterministic networking is a fundamental component of the IoT, and is needed for time critical applications such as industrial automation, inflight control systems, internal vehicle networking, and the like. Most of these application fields are mission critical and require novel solution since up to recently they are manual controlled an operated, the emergence of dynamic system requiring the specification of the number of new solutions to address fast emerging requirements. Accordingly, in some embodiments, routing process 244 may be configured to support deterministic technologies such as Deterministic Ethernet or Deterministic Wireless. Generally, these technologies use time scheduling, to ensure that all nodes of a given path are synchronized. The Network Time Protocol (NTP) and Precision Time Protocol (PTP) are example protocols that may be used to synchronize the local timing mechanisms of the nodes. Forwarding of each packet is then regulated by the synchronized time schedule, which specifies when a given packet has to be transmitted. Generally, this time period is referred to as a time slot. In some implementations, an external agent (e.g., a PCE, etc.), sometimes referred to as a orchestrator, may be configured to compute the path and associated timetables for the path. The computed path and timetable are then downloaded onto every node along the path which, in turn, transmits packets along the path according to the computed time schedule.

An example routing protocol that may be used by routing process 244 for LLNs is specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), which provides a mechanism that supports multi-point-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012). Further, an example OF (e.g., a default OF) may be found in an IETF RFC, entitled "RPL Objective Function 0" <RFC 6552> by Thubert (March 2012) and "The Minimum Rank Objective Function with Hysteresis" <RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
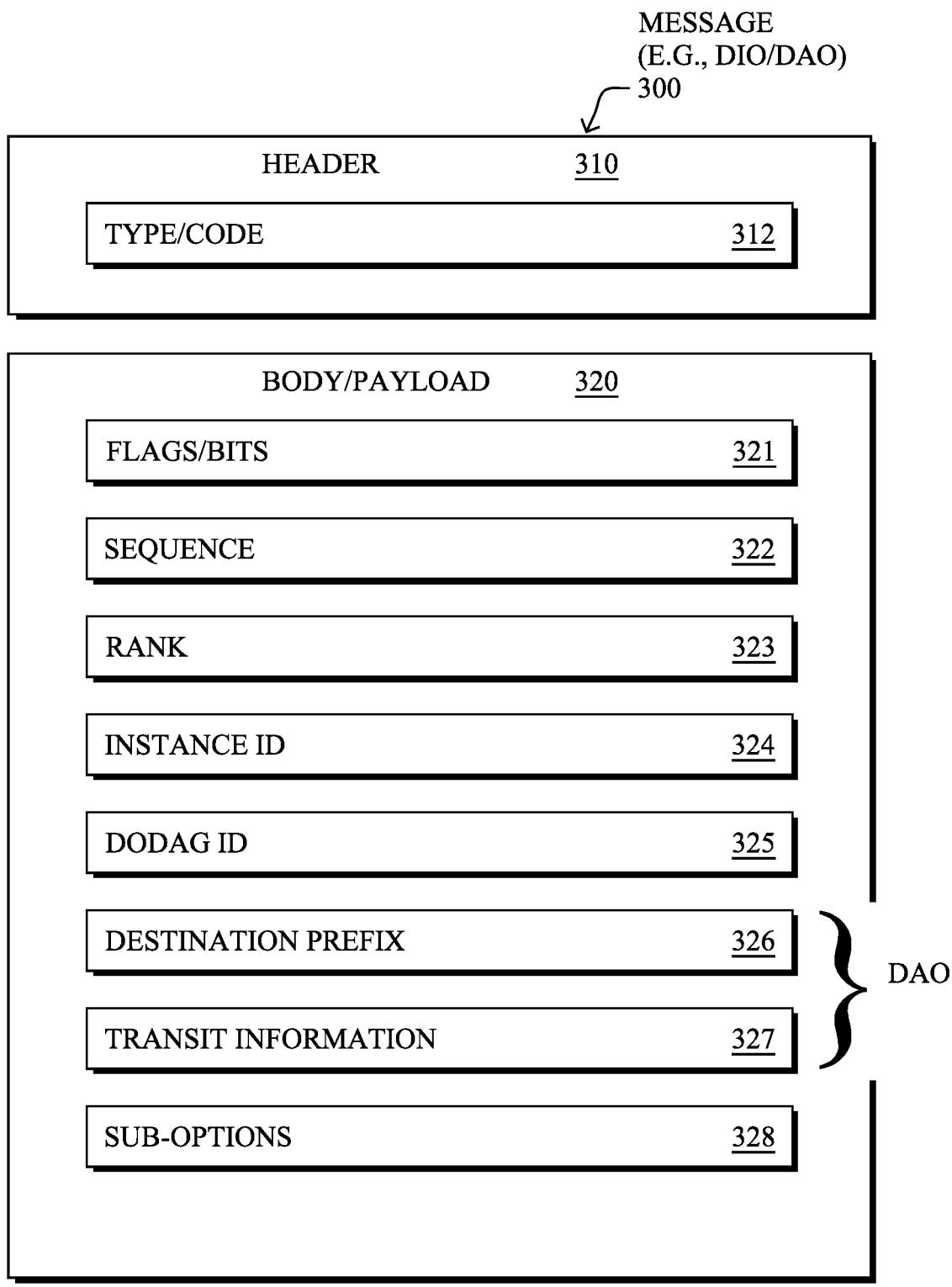
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
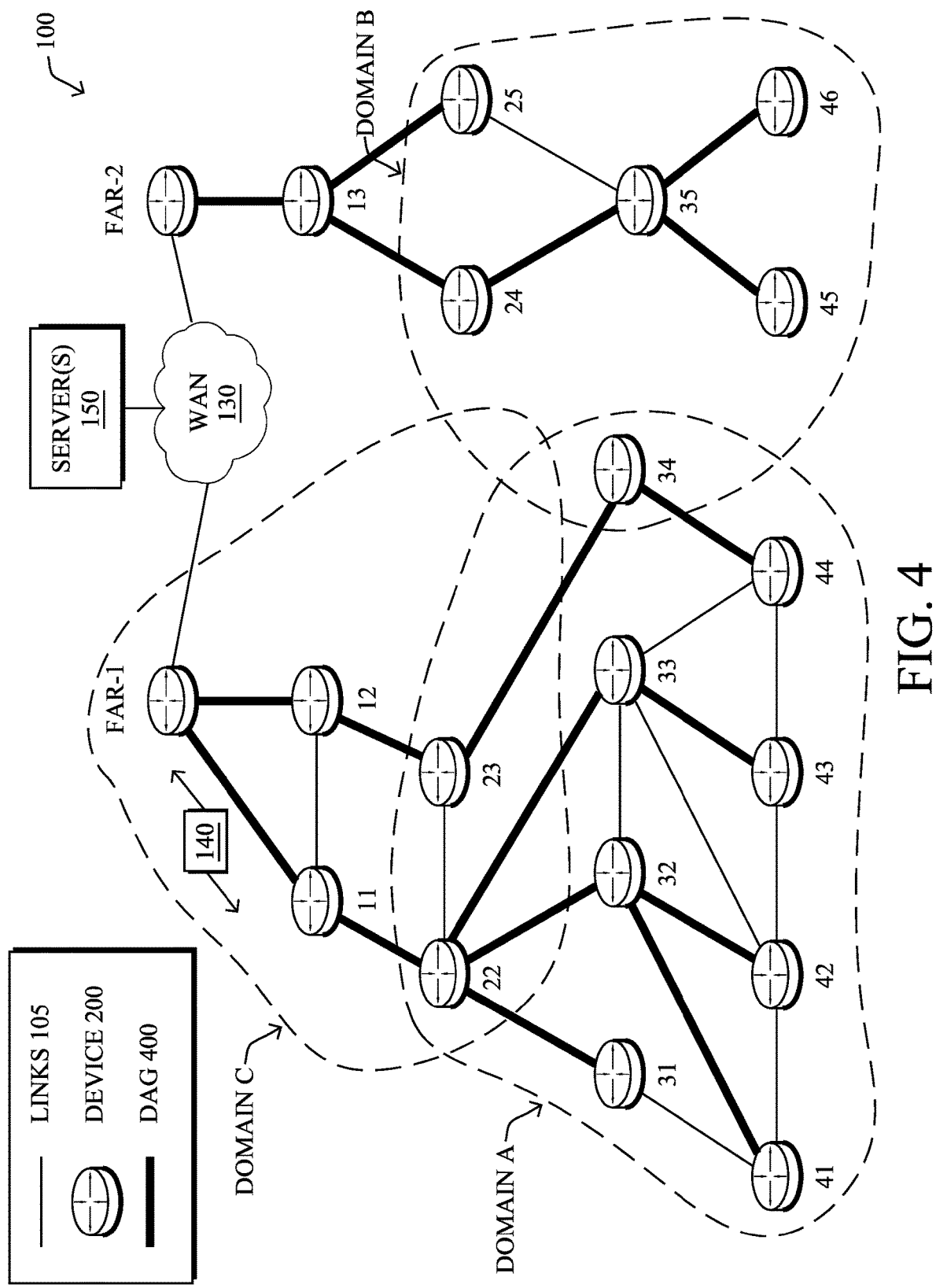
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled media access control (MAC) protocol can be considered deterministic, even when clocks drift in the order of tens of parts per million (ppm). A low-throughput technology such as IEEE 802.15.4 may thus be adapted to support determinism. In particular, the bandwidth can be pre-formatted in a time division multiplexing (TDM) fashion using IEEE 802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH." The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery). Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on time slotted channel hopping (TSCH). More specifically, 6TiSCH is being designed for the IEEE 802.15.4e TSCH mode of operation. This is the standardized version of the MAC that was adopted by all industrial WSN standards, ISA100.11a, WirelessHART and WIAPA.

Another standard that may be used in an LLN is "IPv6 over Low-Power Wireless Personal Area Networks" (6LoW-PAN), as described in the IETF draft entitled "Compression Format for IPv6 Datagrams" by Hui et al. In general, 6LoWPAN seeks to extend IPv6 to LLN devices, which are typically of lower capabilities than traditional computing devices. To do so, 6LoWPAN uses a number of functions to map an IEEE 802.15.4 network to an IPv6 network including, but not limited to:

- Packet size adjustments—6LoWPAN provides for packet size adjustments, as IPv6 uses an MTU of 1280 octets and IEEE 802.15.4 uses a standard packet size of only 127 octets.
- Address resolution—6LoWPAN also provides for address resolution between the two network types, as IEEE 802.15.4 supports various addressing mechanisms, such as 16-bit addresses within a PAN, that must be mapped to 128-bit IPv6 addresses.
- Packet format interoperability—6LoWPAN also allows for packet format interoperability between IPv6 and IEEE 802.15.4 through the use of an adaptation layer.

As noted above, in Smart Grid and other forms of LLN deployments, one key consideration is transmission time. Indeed, transmission time is important not only for improving throughput, but also for reducing collisions between different nodes. Furthermore, reducing transmission times can also help to reduce transmit power consumptions, which can be very important in the case of LLN nodes that are battery powered. However, current approaches to reducing transmission times still introduce a non-negligible amount of overhead due to frame headers, which is especially true in the case of small packets, as well as due to the use of redundant back-off times.

In various embodiments, packet aggregation can be used to help reduce transmission times and overhead in an LLN. In general, packet aggregation entails combining multiple packets into a single packet for transmission. By analogy, this is somewhat akin to shipping several smaller items within the same box, rather than shipping each item separately.

Figure 5:
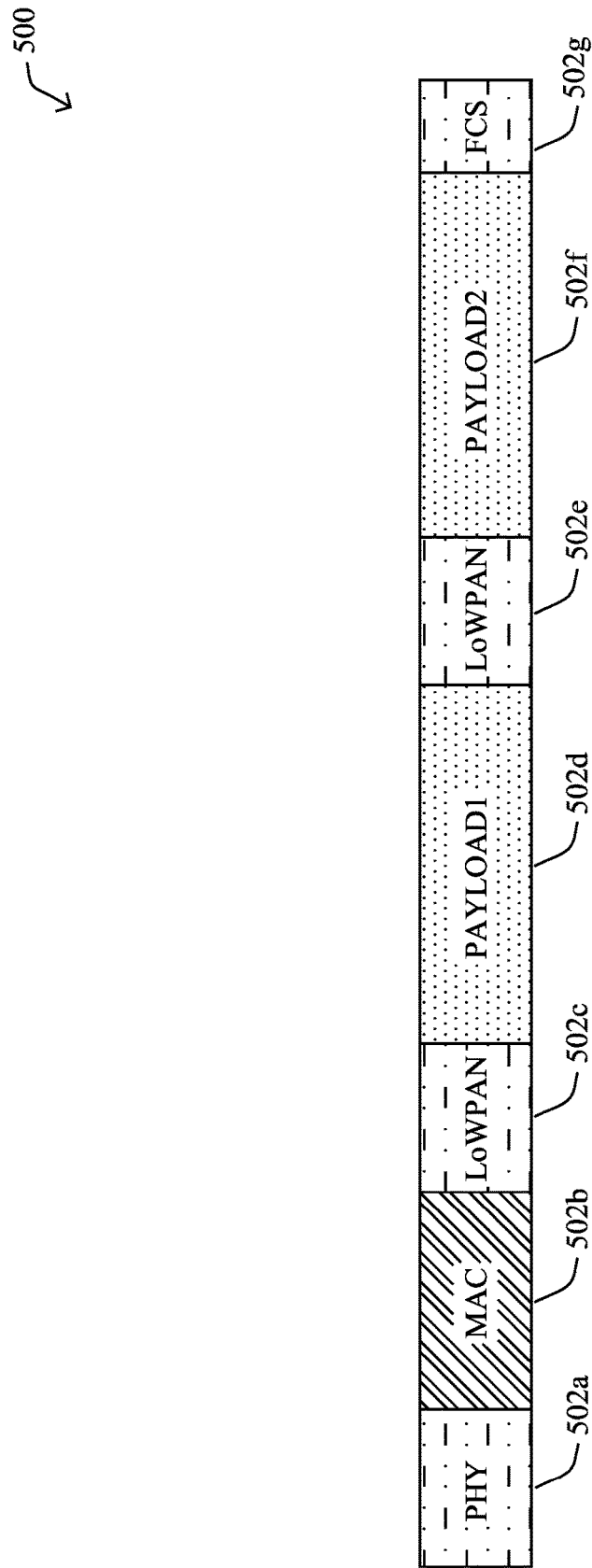
FIG. 5 illustrates one example approach to aggregating packets for transmission in a network.

FIG. 5 illustrates one example approach to aggregating packets for transmission in a network, in some embodiments. As shown, assume that an LLN device needs to send two small packets to a receiver: a first packet and a second packet that share the same MAC and physical layer (PHY) headers. In order to reduce the transmission time and improve the efficiency of the transmission, the sender device may aggregate the packets into a single, aggregated packet 500 shown. Notably, aggregated packet 500 may comprise a plurality of elements 502a-502g including PHY header 502a, a MAC header 502b, a first LoWPAN header 502c for the first packet being aggregated into packet 500, they payload 502d for that first packet, a second LoWPAN header 502e for the second packet being aggregated into packet 500, the payload 502f for the second packet, and a frame check sequence (FCS) 502, which is used for purposes of error detection.

While aggregated packet 500 does offer some efficiencies, this approach also has several downsides. First, aggregated packet 500 cannot hold too many payloads, primarily due to strict signal-to-noise (SNR) requirements. In addition, a single bit error will corrupt the entirety of aggregated packet 500.

Efficient Transmission of Small Packets in LLNs

The techniques herein introduce a packet aggregation approach for use in LLNs and other wireless networks that significantly improves the transmission efficiency of small packets in the network. In some aspects, the techniques herein propose the use of a sub-MAC header within an aggregated packet, to enable more packets to be aggregated. In further aspects, multiple LoWPAN headers can also be compressed within the aggregated packet, if these headers are identical. Additionally, the techniques herein introduce a block acknowledgement mechanism that reduces the sending of redundant acknowledgements and allows the receiver to inform the sender of any payloads in the aggregated packet that were corrupted during transmission.

Specifically, according to one or more embodiments of the disclosure as described in detail below, a device in a network determines that a plurality of packets should be aggregated, each of the plurality of packets comprising a payload. The device generates, for each of the payloads, a sub-media access control (sub-MAC) header that comprises a sequence number and a frame check sequence (FCS). The device forms an aggregated packet that comprises a physical layer (PHY) header, a MAC header, the payloads, and the generated sub-MAC headers for the payloads. The device sends the aggregated packet to another device in the network.

Illustratively, the techniques described herein may be performed by hardware, software, and/or firmware, such as in accordance with the packet aggregation process 248, which may include computer executable instructions executed by the processor 220 (or independent processor of interfaces 210) to perform functions relating to the techniques described herein, e.g., in conjunction with routing process 244.

Figure 6A:
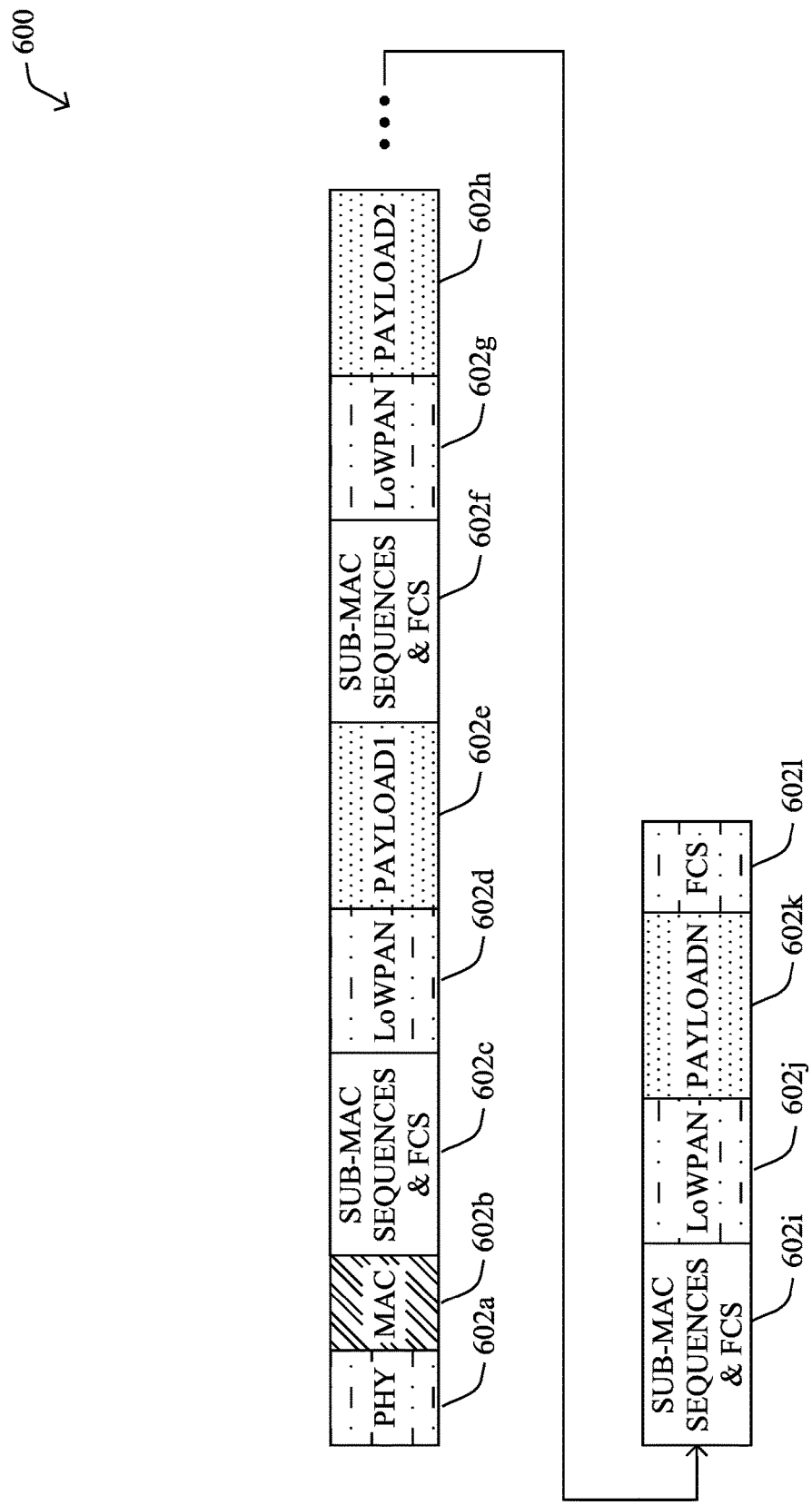
FIGS. 6A-6B illustrate further example approaches to aggregating packets for transmission in a network.

Operationally, FIG. 6A illustrates a further example approach to aggregating packets for transmission in a network, according to various embodiments. Similar to the prior example in FIG. 5, assume that a device in a network determines that a plurality of packets should be sent together as an aggregated packet. For example, the device may determine that the packets should be aggregated based on their sources, destinations, data types or protocols, or any other characteristics that can be used to group like packets, prior to sending them.

According to various embodiments, the device may aggregate the packets into an aggregated packet 600 that includes elements 602a-602k. Similar to aggregated packet 500 in FIG. 5, aggregated packet 600 shown may include a PHY header 602a, a MAC header 602b, and a trailing FCS 602l. In addition, for each of the payloads of the packets included in aggregated packet 600 (e.g., a first payload 602e, a second payload 602h, an n$^{th}$ payload 602k), the device may generate a corresponding sub-MAC header (e.g., headers 602c, 602f, 602i), in various embodiments. In turn, each sub-MAC header may include two parts: 1.) the sequence number of the MAC payload, and 2.) a frame check sequence (FCS) for the corresponding payload.

Also, as shown, aggregated packet 600 may further include a LoWPAN header (e.g., headers 602d, 602g, 602j) for each of the packets/payloads aggregated into aggregated packet 600. Alternatively, in some embodiments, the device may also aggregate these headers into a single LoWPAN header for the aggregated packet, if the LoWPAN headers of the packets being aggregated are the same. This is a common scenario for many data packet flows, particularly if the transport and IP layers are the same. Indeed, UDP is typically used more often than TCP as a transport layer and UDP messages are unlikely to change repeatedly, meaning the LoWPAN header will be the same.

Figure 6B:
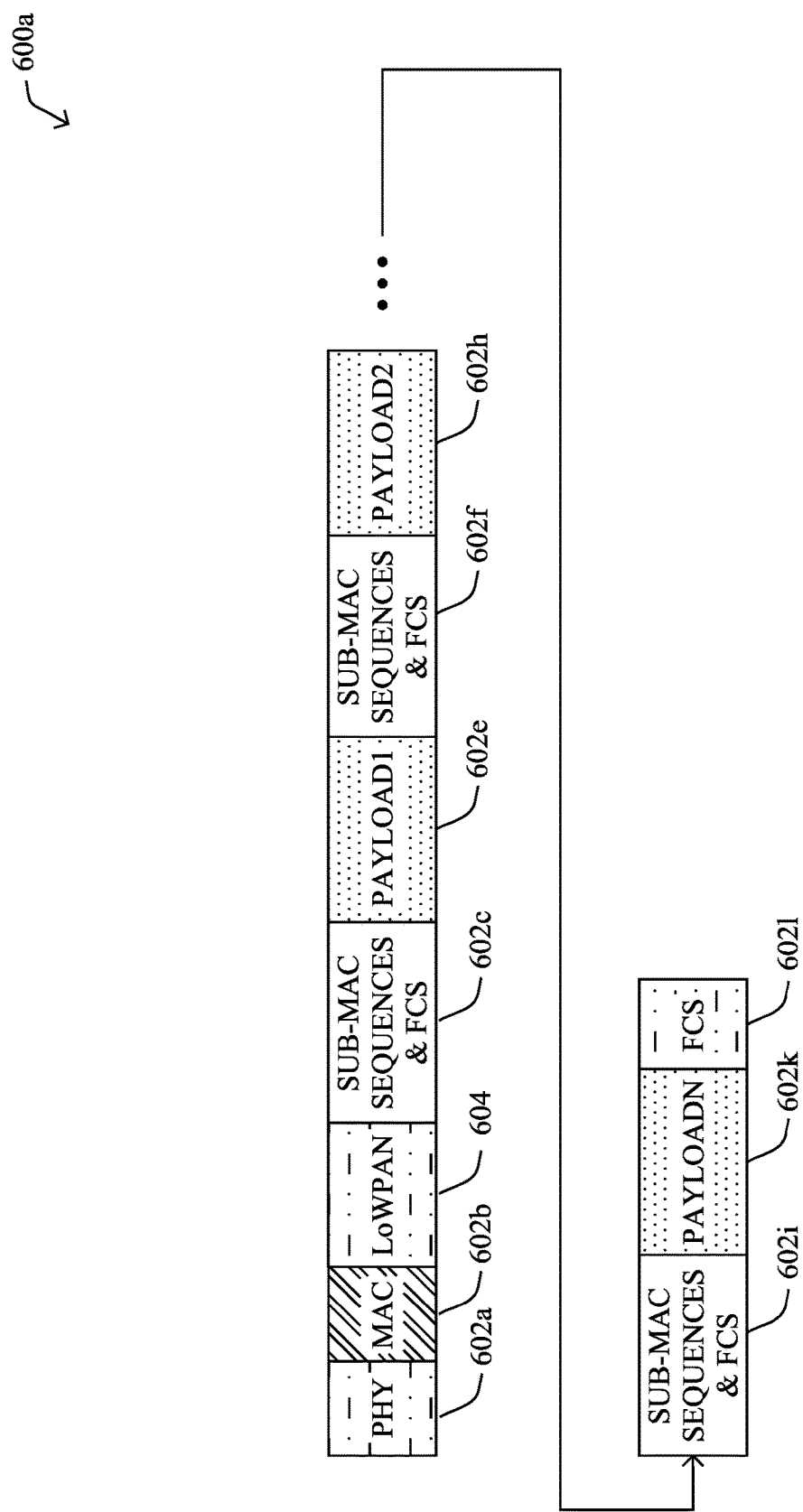

FIG. 6B illustrates an alternative aggregated packet 600a that also compresses the LoWPAN headers of the packets into a single LoWPAN header. As shown, aggregated packet 600a may follow a similar format as that of aggregated packet 600 in FIG. 6A, with a PHY header 602a, a MAC header 602b, a trailing FCS 602l, the payloads of the packets being aggregated (e.g., payloads 602e, 602h, 602k), as well as corresponding sub-MAC headers for each of the included payloads (e.g., headers 602c, 602f, 602i). However, in this case, since the LoWPAN headers of the packets are the same, the device may further aggregate these headers into a single LoWPAN header 604 for inclusion in aggregated packet 600a.

Compared with non-aggregated approaches, the resulting packet using the techniques herein, such as packet 600 or 600a, will use less header length and require less back-off time. Even compared to other aggregation approaches, such as the one used to generate aggregated packet 500 in FIG. 5, the aggregation techniques used to generate packets 600, 600a in FIGS. 6A-6B allow for more packets/payloads to be aggregated into a single packet. In addition, as each payload in the aggregated packet 600, 600a has its own sequence number and FCS within its associated sub-MAC header, this allows the receiver device to identify which payloads, if any, were corrupted during transmission. In contrast, the single FCS used in packet 500 in FIG. 5 requires complete retransmission of all aggregated payloads, if even a single bit is corrupted during transmission.

According to various embodiments, another key aspect of the techniques herein provides for the receiver of an aggregated packet to acknowledge receipt of the payloads in bulk. As would be appreciated, another main issue that affect transmit efficiency is the use of redundant acknowledgements (ACKs). For example, consider the case in which a device sends ten packets to another device, each sent packet having 128 bytes. In such a case, it would be expected that the receiver device will return ten ACKs. However, doing so will cost more back-off time and more RF channel switch time between packet and ACK.

Figure 7:
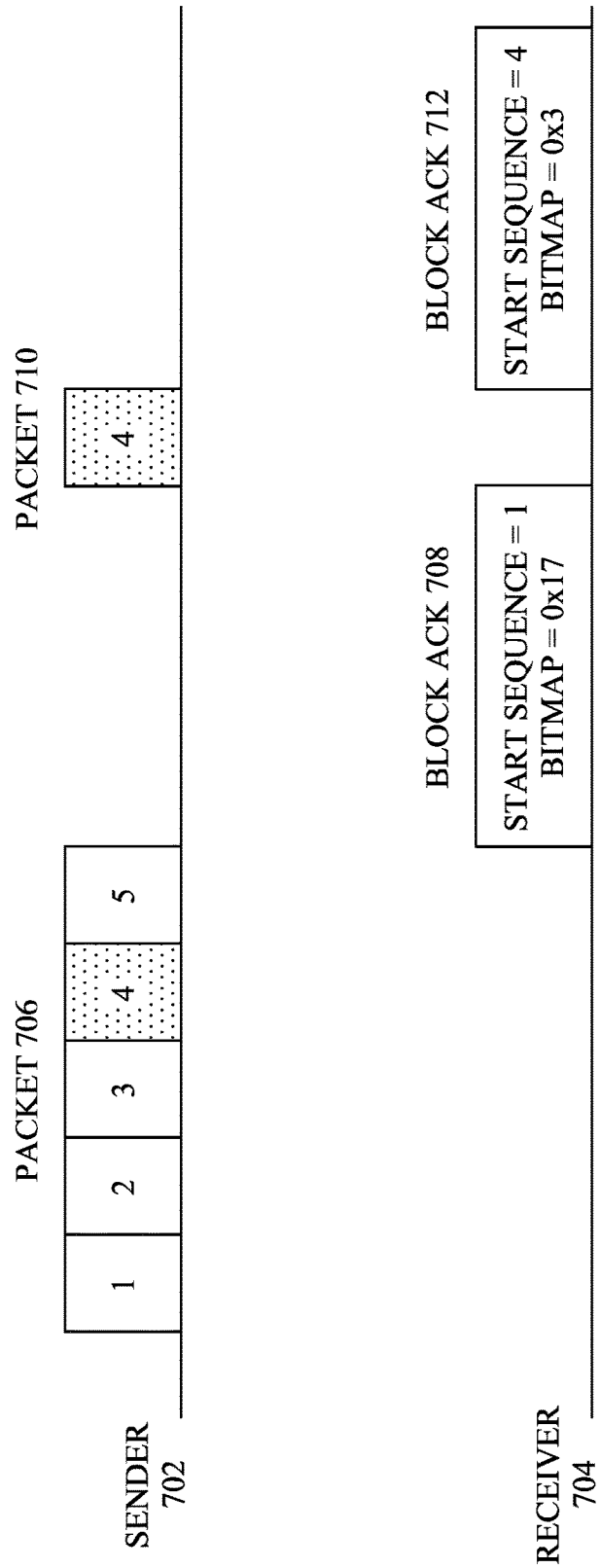
FIG. 7 illustrates an example block acknowledgement mechanism for communications in a network.

FIG. 7 illustrates an example block acknowledgement mechanism 700 for communications in a network, according to various embodiments. As shown, assume that a sender 702 in a network is to send an aggregated packet 706 to a receiver 704 in the network. For purposes of illustration, assume that aggregated packet 706 is generated in accordance with one of the aggregation mechanisms described previously with respect to FIGS. 6A-6B. In particular, assume that packet 706 aggregates five smaller packets, each having its own payload in packet 706 and its own sub-MAC header that indicates its sequence number and FCS. Thus, the sub-MAC headers of packet 706 are labeled with sequence number 1-5.

Now, assume that the fourth payload of aggregated packet 706 becomes corrupted during transmission to receiver 704, for whatever reason (e.g., interference, environmental conditions, etc.). After receiving packet 706, receiver 704 may use the FCSs of the sub-MAC headers of packet 706, to determine that the fourth payload of packet 706 was corrupted. In such a case, in various embodiments, receiver 704 may send a block ACK to sender 702 that indicates which payloads of packet 706 were received correctly and/or which payloads of packet 706 were corrupted (e.g., the fourth payload). For example, block ACK 708 shown may have a start sequence of '1' and include a bitmap with value 0x17. As would be appreciated, hex value 0x17 is 10111 in binary, with each bit indicating whether the corresponding payload sequence was correctly received (e.g., a value of '1') or corrupted (e.g., a value of '0', as in the case of the fourth payload).

Based on block ACK 708 from receiver 704, sender 702 may determine that the fourth packet aggregated into packet 706 was corrupted during transmission and needs to be resent. In turn, sender 702 may resend the fourth packet to receiver 704 as packet 710. If multiple packets/payloads of packet 706 were corrupted, packet 710 may aggregate these packets into a single packet 710, in some embodiments. Of course, if only the fourth packet/payload was corrupted, sender 702 could also re-send just this packet and potentially aggregated with one or more other normal packets in the send queue, to help improve the efficiency. For example, if packet with sequence number '4' is corrupted during transmission of packet 706, the next packet 710 may include packets '4,' and '6' through '10.'

Since the first three packets were correctly transmitted via aggregated packet 706, and the fourth packet/payload was correctly re-transmitted, receiver 704 may send another block ACK 712 to sender 702. Here, the start sequence of block ACK 712 is '4,' corresponding to the fourth packet/payload of packet 706 that was previously corrupted. In addition, block ACK 712 may include a bitmap with value 0x3, which is 11 in binary, to signify that the fourth and fifth packets/payloads of aggregated packet 706 were correctly received by receiver 704.

To illustrate the effectiveness of the techniques herein, assume that a device has ten packets to send, each of 128 bytes. In addition, assume that the PHY header, MAC header, and FCS of each packet comprises 20 bytes, a LoWPAN header comprises 43 bytes, and a sub-MAC header, if used, comprises 8 bytes. In terms of timing, also assume that the PHY mode used is orthogonal frequency-division multiple access (OFDMA) option 2, MCS5 (800 kbps), and the ACK+CCA takes 2 ms. With these assumptions, the various possible approaches would result in the following:

No packet aggregation: Here, the total transmission time can be computed as ((PHY header+MAC header+LoWPAN header+FCS+payload)/data_rate+CCA+ACK)*packet_num=((20+43+128)*8/800+2)*10=39.1 ms Packet aggregation without sub-MAC headers: ((PHY header+MAC header+FCS+(payload+LoWPAN header)*2)/data_rate+CCA+ACK)*packet_num/2= ((20+2*(128+43))*8/800+2)*5=28.1 ms Packet aggregation with sub-MAC headers: (PHY header+MAC header+LoWPAN header+(sub-MAC header+payload)*packet_num)+CCA+ACK=(20+43+ (8+128)*8*10)/800+2=14.88 ms.

Thus, in this example, using the packet aggregation approach introduced herein with sub-MAC headers could reduce the transmission time by 40%, when compared to packet aggregation without sub-MAC headers. In addition, when compared to no packet aggregation at all, the aggregation approach that uses sub-MAC headers reduces the transmission time by approximately 60%.

Figure 8:
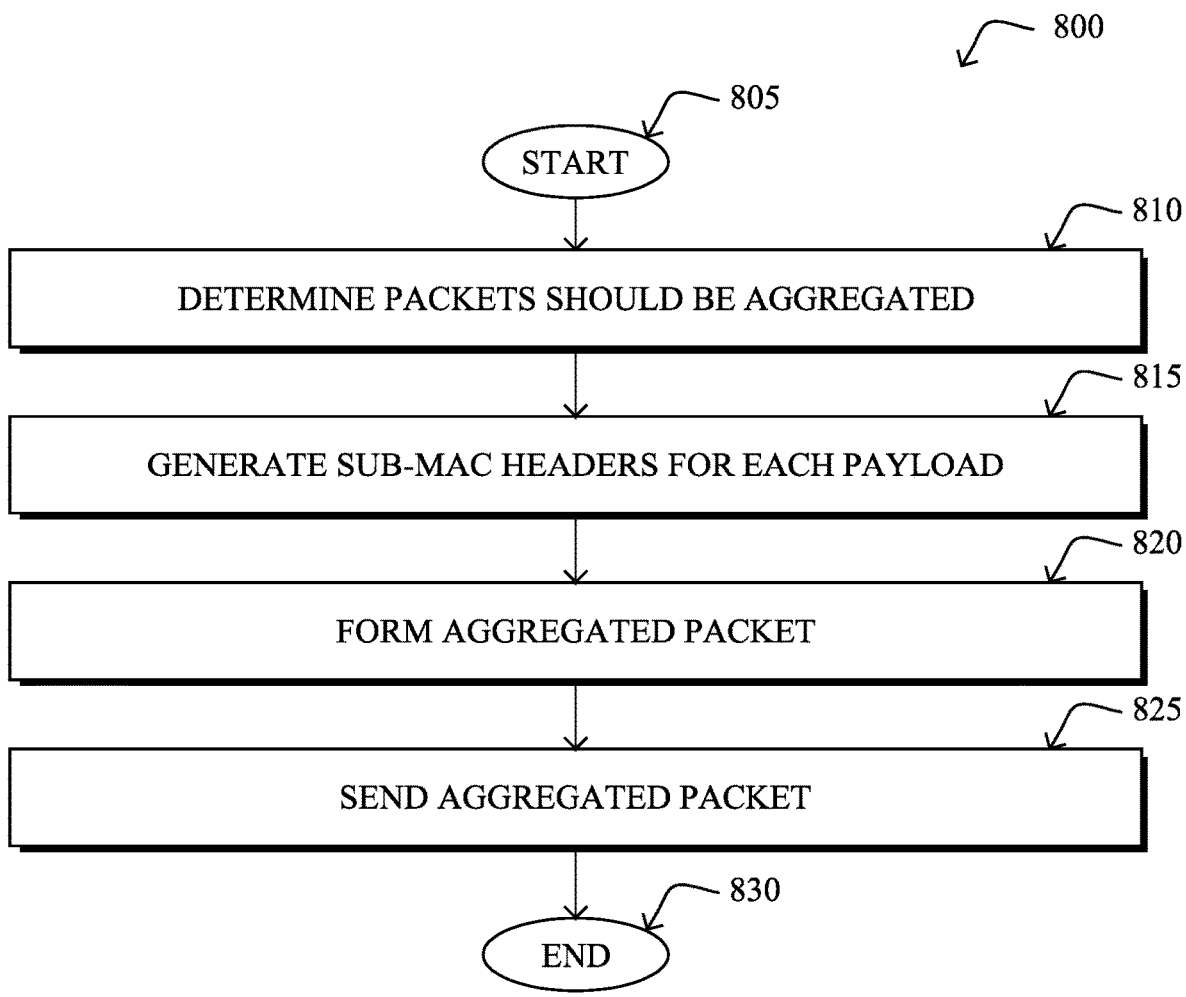
FIG. 8 illustrates an example simplified procedure for aggregating packets in a network for transmission.

FIG. 8 illustrates an example simplified procedure for aggregating packets in a network for transmission, in accordance with one or more embodiments described herein. For example, a non-generic, specifically configured device (e.g., device 200) may perform procedure 800 by executing stored instructions (e.g., process 248). The procedure 800 may start at step 805, and continues to step 810, where, as described in greater detail above, the device may determine that that a plurality of packets should be aggregated, each of the plurality of packets comprising a payload. For example, the device may be an aggregation point in an LLN that receives the plurality of packets from any number of nodes in the LLN. In other cases, the device itself may generate some or all of the packets.

At step 815, as detailed above, the device generates, for each of the payloads, a sub-media access control (sub-MAC) header that comprises a sequence number and a frame check sequence (FCS). A receiver device may use the FCSs to verify that the payloads were transmitted correctly, i.e., were not corrupted during transmission.

At step 820, the device may form an aggregated packet that comprises a physical layer (PHY) header, a MAC header, the payloads, and the generated sub-MAC headers for the payloads, as described in greater detail above. In addition, in some embodiments, the device may also include the LoWPAN headers of the packets within the aggregated packet. Alternatively, in further embodiments, the device may aggregate the LoWPAN headers into a single LoWPAN header within the aggregated packet, if these headers are identical.

At step 825, as detailed above, the device may send the aggregated packet to another device in the network (e.g., a receiver device). In various embodiments, the receiver device may use the FCSs in the sub-MAC headers of the aggregated packet, to determine whether any of the payloads of the aggregated packet were corrupted during transmission. In turn, the other device may return a bulk acknowledgement indicative of whether any of the payloads of the aggregated packet were corrupted during transmission. For example, the bulk acknowledgement may include a bitmap that signifies whether each of the packets/payloads includes in the aggregated packet were corrupted or not. If some corruption occurred, the device that sent the aggregated packet may include the corrupted packet(s)/payload(s) in a second packet transmitted back to the receiver device. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, greatly reduce the transmission time needed to transmit a plurality of smaller packets by aggregating the packets in a single, aggregated packet. In addition, the use of sub-MAC headers within the aggregated packet, as well as the bulk acknowledgement mechanisms introduced herein, can further reduce the total transmission time, which is of key importance in LLN deployments.

While there have been shown and described illustrative embodiments that provide for the efficient transmission of small packets in LLNs, it is to be understood that various other adaptations and modifications may be made within the spirit and scope of the embodiments herein. For example, while certain protocols are shown, such as LoWPAN, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    determining, by a device in a network, that a plurality of packets should be aggregated, each of the plurality of packets comprising a payload, wherein the plurality of packets comprise a first packet and a second packet;
    generating, by the device and for each of the payloads, a sub-media access control (sub-MAC) header that comprises a sequence number and a frame check sequence (FCS);
    forming, by the device, an aggregated packet that comprises a physical layer (PHY) header, a MAC header, the payloads, and the generated sub-MAC headers for the payloads, wherein the aggregated packet includes the generated sub-MAC header, which comprises the sequence number and FCS, for the payload of the first packet, an IPv6 over Low-Power Wireless Personal Area Networks (6LoWPAN) header for the payload of the first packet, and the payload of the first packet followed by the generated sub-MAC header, which comprises the sequence number and FCS, for the payload of the second packet, a 6LoWPAN header for the payload of the second packet, and the payload of the second packet; and
    sending, by the device, the aggregated packet to another device in the network.

2. The method as in claim 1, further comprising:
    including, by the device, IPv6 over Low-Power Wireless Personal Area Networks (6LoWPAN) headers for each of the plurality of packets in the aggregated packet.

3. The method as in claim 1, further comprising:
    aggregating, by the device, IPv6 over Low-Power Wireless Personal Area Networks (6LoWPAN) headers for each of the plurality of packets into a single 6LoWPAN header; and
    including, by the device, the aggregated 6LoWPAN header in the aggregated packet.

4. The method as in claim 1, wherein the network is a Low Power and Lossy Network (LLN).

5. The method as in claim 1, wherein the other device in the network uses the FCSs in the sub-MAC headers to determine whether any of the payloads of the aggregated packet were corrupted during transmission, and wherein the method further comprises:
    receiving, at the device, a bulk acknowledgement indicative of whether any of the payloads of the aggregated packet were corrupted during transmission.

6. The method as in claim 5, wherein the bulk acknowledgement comprises a bitmap that indicates which of the payloads of the aggregated packet were received correctly by the other device.

7. The method as in claim 5, further comprising:
    sending, by the device and in response to the bulk acknowledgement indicating that a particular payload of the aggregated was corrupted, a second aggregated packet to the other device that includes the particular payload, wherein the second aggregated packet includes any payloads from the aggregated packet that were subsequent to the particular payload that was corrupted.

8. The method as in claim 1, further comprising:
    receiving, at the device, the plurality of packets from one or more nodes in the network, each of the plurality of packets being destined for the other device in the network; and
    determining, by the device, that the plurality of packets should be aggregated based on one or more characteristics of the plurality of packets.

9. An apparatus, comprising:
    one or more network interfaces to communicate with a network;
    a processor coupled to the one or more network interfaces and configured to execute one or more processes; and
    a memory configured to store a process executable by the processor, the process when executed configured to:
        determine that a plurality of packets should be aggregated, each of the plurality of packets comprising a payload, wherein the plurality of packets comprise a first packet and a second packet;
        generate, for each of the payloads, a sub-media access control (sub-MAC) header that comprises a sequence number and a frame check sequence (FCS);
        form an aggregated packet that comprises a physical layer (PHY) header, a MAC header, the payloads, and the generated sub-MAC headers for the payloads, wherein the aggregated packet includes the generated sub-MAC header, which comprises the sequence number and FCS, for the payload of the first packet, an IPv6 over Low-Power Wireless Personal Area Networks (6LoWPAN) header for the payload of the first packet, and the payload of the first packet followed by the generated sub-MAC header, which comprises the sequence number and FCS, for the payload of the second packet, a 6LoWPAN header for the payload of the second packet, and the payload of the second packet; and
        send the aggregated packet to a receiver device in the network.

10. The apparatus as in claim 9, wherein the process when executed is further configured to:
    include IPv6 over Low-Power Wireless Personal Area Networks (6LoWPAN) headers for each of the plurality of packets in the aggregated packet.

11. The apparatus as in claim 9, wherein the process when executed is further configured to:
    aggregate IPv6 over Low-Power Wireless Personal Area Networks (6LoWPAN) headers for each of the plurality of packets into a single 6LoWPAN header; and
    include the aggregated 6LoWPAN header in the aggregated packet.

12. The apparatus as in claim 9, wherein the network is a Low Power and Lossy Network (LLN).

13. The apparatus as in claim 9, wherein the receiver device in the network uses the FCSs in the sub-MAC headers to determine whether any of the payloads of the aggregated packet were corrupted during transmission, and wherein the process when executed is further configured to:
    receive a bulk acknowledgement indicative of whether any of the payloads of the aggregated packet were corrupted during transmission.

14. The apparatus as in claim 13, wherein the bulk acknowledgement comprises a bitmap that indicates which of the payloads of the aggregated packet were received correctly by the receiver device.

15. The apparatus as in claim 13, wherein the process when executed is further configured to:
    send, in response to the bulk acknowledgement indicating that a particular payload of the aggregated was corrupted, a second aggregated packet to the receiver device that includes the particular payload, wherein the second aggregated packet includes any payloads from the aggregated packet that were subsequent to the particular payload that was corrupted.

16. The apparatus as in claim 15, wherein the process when executed is further configured to:
    receive the plurality of packets from one or more nodes in the network, each of the plurality of packets being destined for the other device in the network; and
    determine that the plurality of packets should be aggregated based on one or more characteristics of the plurality of packets.

17. A tangible, non-transitory, computer-readable medium storing program instructions that cause a device in a network to execute a process comprising:
    determining, by the device, that a plurality of packets should be aggregated, each of the plurality of packets comprising a payload, wherein the plurality of packets comprise a first packet and a second packet;
    generating, by the device and for each of the payloads, a sub-media access control (sub-MAC) header that comprises a sequence number and a frame check sequence (FCS);
    forming, by the device, an aggregated packet that comprises a physical layer (PHY) header, a MAC header, the payloads, and the generated sub-MAC headers for the payloads, wherein the aggregated packet includes the generated sub-MAC header, which comprises the sequence number and FCS, for the payload of the first packet, an IPv6 over Low-Power Wireless Personal Area Networks (6LoWPAN) header for the payload of the first packet, and the payload of the first packet followed by the generated sub-MAC header, which comprises the sequence number and FCS, for the payload of the second packet, a 6LoWPAN header for the payload of the second packet, and the payload of the second packet; and
    sending, by the device, the aggregated packet to another device in the network.

18. The computer-readable medium as in claim 17, wherein the other device in the network uses the FCSs in the sub-MAC headers to determine whether any of the payloads of the aggregated packet were corrupted during transmission, and wherein the process further comprises:
    receiving, at the device, a bulk acknowledgement indicative of whether any of the payloads of the aggregated packet were corrupted during transmission.

19. The computer-readable medium as in claim 18, wherein the bulk acknowledgement comprises a bitmap that indicates which of the payloads of the aggregated packet were received correctly by the receiver device.

20. The computer-readable medium as in claim 18, wherein the process when executed is further configured to:
    send, in response to the bulk acknowledgement indicating that a particular payload of the aggregated was corrupted, a second aggregated packet to the receiver device that includes the particular payload, wherein the second aggregated packet includes any payloads from the aggregated packet that were subsequent to the particular payload that was corrupted.

* * * * *

UNITED STATES PATENT AND TRADEMARK OFFICE
CERTIFICATE OF CORRECTION

PATENT NO. : 10,917,196 B2
APPLICATION NO. : 16/273251
DATED : February 9, 2021
INVENTOR(S) : Wenjia Wu et al.

Page 1 of 1

It is certified that error appears in the above-identified patent and that said Letters Patent is hereby corrected as shown below:

In the Specification

Column 11, Line 50, please amend as shown:
602*l*. In addition, for each of the payloads of the packets Column 12, Line 8, please amend as shown:
header 602*b*, a trailing FCS 602*l*, the payloads of the Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*